Nov. 1, 1932.   C. L. PEIRCE, JR   1,885,761
LOCK WASHER
Filed Jan. 16, 1931

INVENTOR
Charles L. Peirce Jr.
By Green & McCallister
His Attorneys

Patented Nov. 1, 1932

1,885,761

UNITED STATES PATENT OFFICE

CHARLES L. PEIRCE, JR., OF PITTSBURGH, PENNSYLVANIA, ASSIGNOR OF ONE-HALF TO HUBBARD AND COMPANY, A CORPORATION OF PENNSYLVANIA

LOCK WASHER

Application filed January 16, 1931. Serial No. 509,128.

This invention relates to nut locks, and more particularly, to an improved locking device of the washer type.

An object of this invention is to provide a lock washer having members struck up from the body thereof which will maintain the surfaces between which it is used under tension and at the same time bite into said surfaces.

Another object of this invention is to provide an improved locking washer that will withstand a greater compression than devices heretofore used and, consequently, increase the locking effect of the washer.

A still further object of this invention is to provide a lock washer which can be readily formed from sheet metal or from coiled strip metal at a very low cost and which will firmly grip the surfaces adjacent the washer when pressure is applied to one face thereof.

These and other objects which will be readily apparent to those skilled in this particular art and accomplished by means of this invention, one embodiment of which is described in the following specification and illustrated in the accompanying drawing; wherein Figure 1 is a top plan view of a device embodying this invention;

Figure 1:
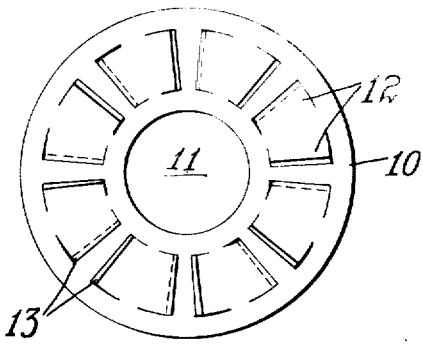

As clearly shown in the drawing, the locking device comprises a washer 10 having a central aperture 11.

The washer is provided with a plurality of tooth-like ribs or tongues 12 which are struck up from the body portion between the inner and outer edges of the washer. The ribs terminate in biting edges 13 which are disposed oppositely to each other and which project at an angle from the body portion of the washer. The biting edges of the ribs are not only oppositely disposed to each other but also project from opposite sides of the washer so that the biting edges of every other rib extends above the body of the washer while the biting edges of the intermediate ribs extend below the body of the washer.

When a device embodying my invention is used to lock a nut to another surface, the teeth adjacent the face of the nut are compressed by tightening the nut. The teeth on the opposite side of the washer resist this compression and bite into the surface to which the nut is being secured and, at the same time, the resistance of the teeth adjacent the surface to which the nut is being locked cause the biting edges on the teeth adjacent the face of the nut to bite into the the nut, thus doubly locking the nut to the surface. Since the teeth normally project beyond the faces of the washer, the tightening of the nut compresses the teeth and places them under tension which forces the teeth to bite deeper into the surfaces when vibration or the like occurs. Thus the nut is effectively locked to the surface and turning or backing off is prevented.

The teeth are arranged in oppositely disposed pairs and I prefer to have a sufficient number of teeth projecting beyond each side of the washer so that when the nut is tightened the compression on the teeth will be uniformly distributed and thus prevent the nut from binding on the threads of the bolt and also to increase the resistance of the teeth to compressive forces and increase the tension when under compression.

Figure 5:
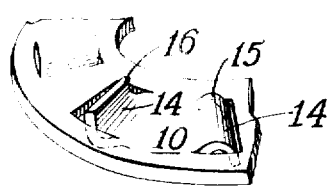
Fig. 5 is a partial view in perspective of the device illustrated in Figure 3.
Figure 3:
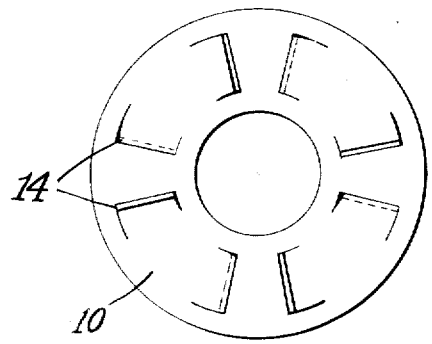
Fig. 3 is a top plan view of a modified form of construction.
Figure 4:
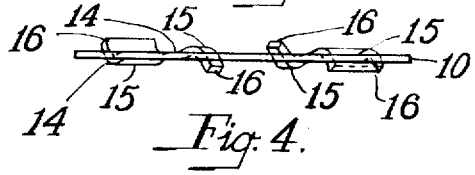
Fig. 4 is a view in end elevation of the device illustrated in Figure 3.

In Figures 3, 4 and 5 I have illustrated a locking washer in which the teeth or tongues are designed to have a greater resistance to the compressing force of the nut and, consequently, to increase the biting and locking effect of the washer. In this modification the body portion 10 is provided with a plurality of arcuate shaped teeth-like ribs or tongues 14 which are oppositely disposed from each other and which project from the body portion of the washer on opposite sides thereof. The teeth 14 are bent on a radius from the plane of the washer so that each tooth has a rounded portion 15 projecting beyond the plane of the washer on one side and a biting edge 16 projecting beyond the plane of the washer on the opposite side from the rounded portion 15. Teeth constructed in accordance with this modification will resist a greater compressing force than teeth constructed in the ordinary manner since the nut, on being tightened, rides on the rounded portion 15 which forces the biting edges 16 into the surface to which the nut is being locked. At the same time the rounded portions on the opposite side of the washer, being in engagement with the adjacent surface, forces the biting edges of the teeth extending on the opposite side of the washer into the face of the nut effectively locking the nut to the surface.

Figure 6:
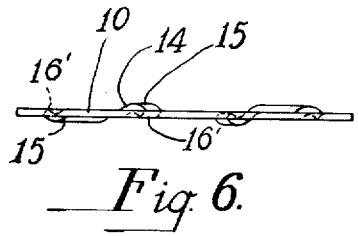
Fig. 6 is an end view of a modification of the washer shown in Fig. 3.
Figure 2:
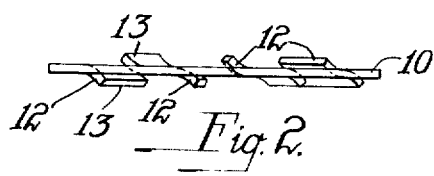
Fig. 2 is a view in end elevation of the lock washer of Figure 1.

In a lock washer formed with arcuate shaped teeth, as described, it is not necessary to have the biting edges of the teeth project beyond the plane of the washer in order for it to be effective. In Fig. 6 I have illustrated a modified type of lock washer in which the the teeth or tongues 14 are arcuate in shape and have a rounded portion 15 extending beyond the plane of the washer. The teeth terminate in biting edges 16' which are even with or just inside the plane of the washer. When a washer embodying the modification is used to lock a nut to another surface, the pressure of the tightened nut bearing on the rounded portions of the teeth force the biting edges 16' out of the plane of the washer into engagement with the surface to which the nut is being secured, while the biting edges of the oppositely disposed teeth are forced into engagement with the face of the nut by the pressure of the surface on the oppositely disposed rounded portions.

By having arcuate shaped teeth, with each tooth having a portion extending above the plane of the washer and another portion extending below that plane, it is readily apparent that I have designed a locking device which will have greater resistance to compression than is obtainable in the ordinary type of locking device, because greater pressure is obviously necessary to force the arcuate shaped teeth back into the plane of the washer and this is especially so when the pressure is applied to the rounded portion of the tooth and must work against the inclined portion thereof terminating in the biting edge.

I preferably make my improved lock washer from sheet metal or from coiled strip metal having the desired properties such as the proper resiliency, etc., by stamping therefrom, or by any other suitable method.

While I have illustrated an embodiment of my invention in which the teeth are struck up from between the inner and outer edges of the washer and the biting edges extend at right angles to the edges of the washer, it is to be understood that the teeth may be of any desired shape and may be formed so that the biting edges would be parallel to the outer edge of the body portion, or in any desired position.

Also, it is to be understood that certain changes, additions, substitutions and omissions, which are apparent to those skilled in this particular art, from the foregoing description, may be made without departing from the spirit of my invention or the scope of the appended claims.

What I claim as new and desire to secure by Letters Patent is:

1. A lock washer comprising a flat annular ring having a plurality of tooth-like ribs formed thereon, each of said ribs having a rounded portion projecting beyond one face of said ring and a biting edge normally positioned within the plane of the opposite face from said rounded portion, the biting edges of alternate ribs being forced beyond opposite sides of said body portion.

2. A lock washer comprising a flat apertured member having a plurality of tooth-like ribs formed thereon between the inner and outer edges thereof, each of said ribs having a biting edge normally positioned in the plane of said member and means on said rib for forcing said biting edge beyond the plane of said member.

3. A lock washer comprising an annular flat apertured member having a plurality of tooth-like ribs formed thereon between the inner and outer peripheries thereof, alternate ribs having oppositely disposed biting edges, said edges being normally positioned in the plane of said member and rounded portions on each of said ribs projecting beyond the plane of said member for forcing said biting edges out of the plane of said member.

4. A lock washer comprising an apertured body portion having a plurality of ribs formed thereon between the inner and outer peripheries thereof, each of said ribs having a rounded portion projecting beyond one face of said body portion and a biting edge normally disposed within the plane of the opposite face of said body portion.

5. A lock washer comprising an apertured body portion having a plurality of tooth-like ribs formed thereon, each of said ribs having a biting edge normally positioned in the plane of one face of said body portion and a portion extending beyond the plane of the opposite face of said body portion.

6. A lock washer comprising an apertured body portion having a plurality of tongues formed therein of such form and shape that alternate tongues have oppositely disposed curved portions located outside of the planes of the opposite faces of said body portion to form bearing surfaces, and oppositely disposed biting edges normally positioned in the plane of said body portion so that when said curved portions are subjected to a compression load the biting edges are forced out of the plane of the body portion.

In testimony whereof, I have hereunto subscribed my name this tenth day of January, 1931.

CHARLES L. PEIRCE, Jr.

CERTIFICATE OF CORRECTION.

Patent No. 1,885,761.　　　　　　　　　　　　November 1, 1932.

CHARLES L. PEIRCE, JR.

It is hereby certified that error appears in the printed specification of the above numbered patent requiring correction as follows: Page 2, lines 94 to 96 inclusive, claim 1, strike out the words "from said rounded portion, the biting edges of alternate ribs being forced beyond opposite sides of said body portion"; and that the said Letters Patent should be read with this correction therein that the same may conform to the record of the case in the Patent Office.

Signed and sealed this 17th day of January, A. D. 1933.

(Seal)　　　　　　　　　　　　　　　　　　M. J. Moore,
　　　　　　　　　　　　　　　　　Acting Commissioner of Patents.

body portion having a plurality of tongues formed therein of such form and shape that alternate tongues have oppositely disposed curved portions located outside of the planes of the opposite faces of said body portion to form bearing surfaces, and oppositely disposed biting edges normally positioned in the plane of said body portion so that when said curved portions are subjected to a compression load the biting edges are forced out of the plane of the body portion.

In testimony whereof, I have hereunto subscribed my name this tenth day of January, 1931.

CHARLES L. PEIRCE, Jr.

CERTIFICATE OF CORRECTION.

Patent No. 1,885,761.   November 1, 1932.

CHARLES L. PEIRCE, JR.

It is hereby certified that error appears in the printed specification of the above numbered patent requiring correction as follows: Page 2, lines 94 to 96 inclusive, claim 1, strike out the words "from said rounded portion, the biting edges of alternate ribs being forced beyond opposite sides of said body portion"; and that the said Letters Patent should be read with this correction therein that the same may conform to the record of the case in the Patent Office.

Signed and sealed this 17th day of January, A. D. 1933.

(Seal)

M. J. Moore,
Acting Commissioner of Patents.

CERTIFICATE OF CORRECTION.

Patent No. 1,885,761.  November 1, 1932.

CHARLES L. PEIRCE, JR.

It is hereby certified that error appears in the printed specification of the above numbered patent requiring correction as follows: Page 2, lines 94 to 96 inclusive, claim 1, strike out the words "from said rounded portion, the biting edges of alternate ribs being forced beyond opposite sides of said body portion"; and that the said Letters Patent should be read with this correction therein that the same may conform to the record of the case in the Patent Office.

Signed and sealed this 17th day of January, A. D. 1933.

(Seal)

M. J. Moore,
Acting Commissioner of Patents.